UNITED STATES PATENT OFFICE.

FREDERICK LANG, OF VIENNA, AUSTRIA, AND CHARLES AUGUST FREY, OF STORRÉ, STYRIA.

IMPROVED PROCESS FOR SMELTING IRON.

Specification forming part of Letters Patent No. 51,531, dated December 12, 1865.

*To all whom it may concern:*

Be it known that we, FREDERICK LANG and CHARLES AUGUST FREY, have invented a new and improved process of smelting scoriæ (cinders) of iron or certain peculiar kinds of ores to obtain iron therefrom, of which the following is an exact description.

The scoriæ obtained by whatever process of the manufacturing of iron, are comminuted by any convenient mechanical operation to a coarse sand. They are then thoroughly mixed with slaked lime, and also comminuted carbon, in the proportion of one hundred parts cinders to thirty-three to forty parts lime (unslaked) and fifteen to twenty parts carbon. The carbonaceous matter may be fine coal-dust of little value, be it charcoal, coke, bituminous, or anthracite, and this proportion of materials may be somewhat modified according to the character of the materials worked up. To the same process may be subjected certain kinds of iron ores, such, for instance, as are found in a comminuted state, as magnetic-iron sand, iron glimmer, bog-ores, and similar ores, which are very refractory. The mass so mixed, whether cinders or ore, will be plastic, and is then spread out to dry, and when sufficiently dried it is broken up in lumps of the size of a man's fist, or it can be made by any process into bricks of regular shape and dried in this shape. It is then treated as ordinary ores in any smelting-furnace, to melt and obtain the iron contained therein.

The advantages of this method are these:

First, the more intimate and close contact of the scoria or sandy ores with the reducing agents—lime and carbon—facilitates the reduction at a lower heat and effects a nearly complete desulphuration of the cinders or ores, and the iron which results shows only slight traces of sulphur.

Second, when, as has been heretofore done, such cinders have been mixed with fresh iron ores for smelting not comminuted, they were, in consequence of their great density, never thoroughly reduced before they had gone down to the melting-zone of the furnace, and when arrived there they melted at once on the surface of the molten iron, cooling it and covering it again with dense scoriæ, which often prevent the reduced ores from melting and going down.

Third, when in the place of slaked lime, limestone (unburned) is used, as it is done now, the carbonic acid of the limestone has to be driven out at the expense of carbon or fuel in the furnace, and in the same proportion the reduction of iron is lessened.

Fourth, the thorough admixture of the materials equalizes the process in the furnace, and it results that cinders and ores which are refractory and of difficult reduction are by this process readily reduced, and with a sensible economy of fuel.

Fifth, there are ores which cannot be used at all, on account of their being partly composed of unsuitable minerals, such as baryta, zinc, or an undue proportion of quartzose matter. Such admixtures can be easily separated by preparatory processes, such as sifting, washing, or what is understood under the term "concentrating," when the ores are comminuted and the useful iron parts made available by the above-described method.

What we claim as our invention, and desire, by Letters Patent, is—

The process, substantially as herein described, of preparing certain refractory ores and scoriæ (cinders) produced in the manufacture of iron preparatory to and facilitating the reduction thereof, as described.

FREDERICK LANG.
C. AUG. FREY.

In presence of—
JOS. TOMANSARGER,
FZ. AMPLETTE.